United States Patent
Patrick (10) Patent No.: US 6,203,857 B1
(45) Date of Patent: *Mar. 20, 2001

(54) CLOSED LOOP CONTROLLABLE FLUID APPLICATION SYSTEM

(76) Inventor: Dennis A. Patrick, 2615 Moldrum, Windsor, Ontario (CA), N8W 4G3

(*) Notice: Subject to any disclaimer, the term of this patent is extended or adjusted under 35 U.S.C. 154(b) by 0 days.

This patent is subject to a terminal disclaimer.

(21) Appl. No.: 09/084,362

(22) Filed: May 22, 1998

Related U.S. Application Data (62) Division of application No. 08/470,930, filed on Jun. 6, 1995, now Pat. No. 5,755,882.

(51) Int. Cl.$^7$ .................. B05B 1/28; B05D 1/02
(52) U.S. Cl. ............................ 427/421; 118/326
(58) Field of Search .................... 427/421; 118/326, 118/DIG. 7

(56) References Cited

U.S. PATENT DOCUMENTS

| | | |
|---|---|---|
| Re. 33,510 | 1/1991 | Williams . |
| 2,041,001 | 5/1936 | Knowzton . |
| 2,086,514 | 7/1937 | Saunders et al. . |
| 2,400,315 | 5/1946 | Paasche . |
| 2,763,575 | 9/1956 | Bede . |
| 3,516,388 | 6/1970 | Barnes . |
| 3,528,358 | 9/1970 | Pickard . |
| 3,750,622 * | 8/1973 | Repp et al. ............... 118/326 |
| 3,814,322 * | 6/1974 | Waldrum ............... 239/251 |
| 4,171,034 | 10/1979 | Gallant . |
| 4,284,670 * | 8/1981 | Kole ....................... 427/422 |
| 4,483,271 * | 11/1984 | Eidschun et al. ............ 118/698 |
| 4,505,406 * | 3/1985 | Cobbs, Jr. et al. ............ 222/135 |
| 4,738,219 | 4/1988 | Fujisawa . |
| 5,054,583 | 10/1991 | Wrzyszczynski . |
| 5,125,480 | 6/1992 | Gregory et al. . |
| 5,129,482 | 7/1992 | Warner et al. . |
| 5,188,135 | 2/1993 | Neumann et al. . |
| 5,192,139 | 3/1993 | Hiramoto et al. . |
| 5,330,576 * | 7/1994 | Clauditz, deceased ............ 118/688 |
| 5,415,676 * | 5/1995 | Tokar et al. ............ 55/318 |
| 5,672,187 * | 9/1997 | Rock et al. ............ 55/257.4 |

OTHER PUBLICATIONS

Walzel, Spraying and Atomizing of Liquids, Ullmann's Encyclopedia of Industrial Chemistry, Vo. B2, pp. 6–1–6–13, Jan. 1988.*

* cited by examiner

Primary Examiner—Shrive Beck
Assistant Examiner—Jennifer Calcagni
(74) Attorney, Agent, or Firm—Young & Basile, P.C.

(57) ABSTRACT

A closed loop controllable fluid application system is provided, comprising a substantially enclosed housing, having horizontal and vertical surfaces, with an inlet and an outlet slot formed in opposing vertical surfaces allowing passage of a work piece through the housing; and a mist outlet and a sump drain each formed in one of a horizontal and a vertical surface. Fluid circulation lines communicate with the housing and an application fluid source, terminating inside the housing with a connection to one or more controllable spray devices for delivering atomized application fluid to coat passing work pieces. A mist collector evacuates air through the mist outlet and extracts application fluid from the evacuated air. The mist collector and the sump drain are connected to fluid circulation lines for recycling excess liquid and air-borne application fluid. A method of using this fluid application system comprises the steps of pumping application fluid through the circulation lines to the spray head(s); atomizing application fluid; spraying atomized application fluid onto a work piece; and recycling excess application fluid by evacuating housing air, separating application fluid from evacuated air through the use of centrifugal force, and draining fluid through the sump drain.

30 Claims, 3 Drawing Sheets

CLOSED LOOP CONTROLLABLE FLUID APPLICATION SYSTEM

CROSS-REFERENCE TO RELATED APPLICATIONS

This application is a divisional of copending application Ser. No. 08/470,930, filed Jun. 6, 1995 now U.S. Pat. No. 5,755,882.

BACKGROUND OF THE INVENTION

This invention relates to an improved fluid application system, useful in applying application fluids to work pieces for coating or lubrication in preparation for subsequent manufacturing operations on such work pieces.

More specifically, this invention describes a new and improved closed loop controllable fluid application system, which involves one or more controllable atomizing spray devices located inside a substantially enclosed housing for spraying a coating of application fluid, such as drawing oil, onto work pieces such as metal sheets or blanks passing into and out of the housing, with the application fluid delivered through circulation lines connected to a fluid source. Through the use of controllable spray devices and a mist collector, application fluid losses to the environment surrounding the system are minimized; desired coverage of work pieces with fluid may be accomplished with substantially reduced atomizing pressure and corresponding fluid pressure at the spray device; and optional use of a heater enables application fluids with temperature variable viscosity to be controllably sprayed regardless of their room temperature characteristics.

In many manufacturing processes, work pieces such as continuous sheet metal strips or metal blanks are coated with an application fluid appropriate to the manufacturing operation to follow. This may be a fluid chosen to principally coat the work piece, and/or to lubricate the work piece in preparation for a stamping operation, or other metal forming, treatment or assembly.

As an example, in the metal stamping industry, drawing oil compounds are applied to blanks or roll stock in open atmosphere of the manufacturing facility using rollers, brushes, drip bar systems, or uncontrolled spray devices. This may result in uncontrolled dispensing of the fluid.

At times this application takes place at a location independent of other manufacturing machinery and equipment. At other times it occurs at remote locations on a ram of a stamping press, with the spray coating the die and the work piece in an uncontrolled fashion.

Where spray devices are the technique of choice, this application typically takes place with pressurized fluid forced through an orifice, or with atomizing gas or liquid introduced into a stream of application fluid under relatively high pressure. In each case, this causes atomization of the application fluid and uncontrolled spraying of that application fluid toward the work piece. This may result in heavy runoff of application fluid from the die, the work piece and/or the press, and emission of fluid to the ambient atmosphere in a mist, to which operators and other employees are exposed. This fluid, in runoff and mist form, must be contained, removed and disposed of due to hazardous chemical laws and potential health hazards of its exposure to humans. Where application fluid is incompatible with any manufacturing step after metal stamping operations, that fluid must be washed off and properly disposed of, adding another stage at which it is advantageous to have the minimum required amount of fluid present on the work piece.

Conventional application systems may also incur a substantial loss of fluid volume during coating operations, from emissions of fluid into the air in a mist, or excessive volume of the application fluid directed toward the work piece. This results in undesirable down time, cost and extra manufacturing operations to replenish such fluid.

Because of uncontrolled application of fluid, conventional systems also frequently expose the dies and other machinery and work pieces to damage from inappropriate lubrication. This may, for example, arise due to inadequate lubrication, or excessive lubrication and consequent damaging die movement ("hydraulic cylindering"). Wearing and structural damage to the dies may occur in such cases. Inadequate lubrication causes significant increases in scrappage rate for work pieces. Each circumstance may increase down time, add to manufacturing steps and the cost of cleaning the environment and replacing lost fluid.

A cabinet structure may be used to partially contain the runoff of excess application fluid, and emitted application fluid given off in a mist from a coating operation. However, the necessary entry and exit slots for work pieces to traverse the cabinet, along with high pressure atomizing spray, typically permit application fluid to escape from such cabinets. This virtually negates the containment effect of enclosing the operation.

To the extent that other devices such as drip bars, brushes or similar techniques take the place of high pressure spraying, problems also arise in clogging of the applicator device, wearing of the brushes, and excessive down time for maintenance (such as brush replacement) and dealing with work pieces which receive inadequate or excessive application fluid. Such techniques also suffer from the problems of uncontrollable application, as well as lack of uniformity in dispensing fluid across the work piece. Problems with such techniques are in large part a reason for the use of high pressures in spraying operations. Use of high pressure is an attempt to ensure that sufficient application fluid is applied to avoid any damage to die or work piece—as any such problems either result in scrapping of the work piece, or costly and time consuming repairs to the die.

One attempt to improve fluid application systems uses an electrostatically charged drip bar. By introducing an electric charge to a conductive drip bar in such a system, the application fluid flowing through the system also becomes electrostatically charged. As this occurs, the fluid is caused to atomize upon exiting the drip bar at a series of spaced openings in the drip bar. This approach requires additional components and costs (such as adding a source of electric charge) and limits the system to operating with conductive fluids. In addition, such systems may result in electrically charging and attracting of air-borne contaminants. This may contaminate the application fluid sprayed onto a work piece, and lead to clogging of drip bar components, thus increasing rather the decreasing down-time for maintenance. These problems in turn lead to addition of potentially complex filtration sub-systems, difficult cabinet design, and more difficult, complicated maintenance steps. Such systems may lack the capability of operating within a compact, portable enclosure, and lack the simplicity and reliability of design and operation sought in fluid application systems.

Conventional systems further do not permit controllable application of the volume, depth and directional reach of application fluid spray that is applied to the work piece in the context of a reliable, portable closed loop system that can operate at relatively low atomizing pressures regardless of the application fluid viscosity encountered.

Thus it can be seen that a need exists for a controllable fluid application system, operating in a closed loop such that application fluid escaping to the plant environment is minimized, a desired coating of application fluid may be applied to the work piece, but the system is portable, of simple and cost effective construction, and operates efficiently without substantial down time, and with relatively low atomizing pressure and fluid pressure at the spray device, regardless of the viscosity of the application fluid in use.

It is, therefore, an object of the present invention to provide a controllable closed loop system for delivering application fluid to a work piece.

It is another object of the present invention to provide an improved fluid application system which permits controllable atomized spray of application fluid onto a work piece at substantially reduced atomizing pressures and fluid pressures, regardless of fluid viscosity.

It is a further object of the present invention to provide an improved fluid application system which controls temperature dependent viscosity of application fluid to maximize atomizing spray efficiency using relatively low atomizing and fluid pressures.

Yet another object is to provide a fluid application system which minimizes loss of application fluid into the ambient environment, and resulting contamination of same, through reduction in runoff and emission of fluid particles in an air-borne mist.

It is yet another object of the present invention to provide a fluid application system which reduces the exposure of employees and others to application fluid contaminants in liquid and air-borne form.

It is another object of the present invention to provide a fluid application system which recycles application fluid in both liquid and air-borne mist form for reuse within the system.

It is a further object of the present invention to provide an improved fluid application system which minimizes wearing and other damage which may shorten the life of dies and other manufacturing machinery which results from uncontrolled coating of work pieces with application fluid.

Yet another object of the present invention is to provide an improved fluid application system which allows a reduction in scrap rates for work pieces in manufacturing operations resulting from uncontrolled coating of work pieces with application fluid.

It is yet another object of the present invention to provide an improved fluid application system permitting substantially reduced manufacturing down time, and reduced incidence of maintenance operations, to replenish lost application fluid, and clean the ambient environment and application system components.

It is another object of the present invention to provide an improved controllable spray device for use in a fluid application system, permitting variable volume, fan profile, time and dimensional spray coverage characteristics, with optional modular construction to reduce down time for maintenance.

It is a further object of the present invention to provide a relatively compact, light weight, portable and efficient fluid application system of simple construction.

SUMMARY OF THE INVENTION

The present invention presents a solution to the problems described above, by providing, in one preferred embodiment, a new and improved closed loop controllable fluid application system, comprising a substantially enclosed housing optionally having one or more horizontal surfaces connected to a plurality of connected vertical surfaces, with an inlet and an outlet slot in opposing vertical surfaces allowing passage of a work piece having a top planar surface, a bottom planar surface and a plurality of side planar surfaces into and out of said housing, a mist outlet formed in one of a horizontal and a vertical surface, and a sump drain formed in one of a horizontal surface and a vertical surface. In addition, a mist collector is connected to said housing at the mist outlet, for evacuating air from the housing and recycling application fluid. One or more controllable atomizing spray devices are each connected to a fluid circulation line to permit controlled spraying of application fluid onto a work piece within the housing. At least one fluid circulation line acts as a fluid conduit for the system, connecting each spray device and the sump drain with an external application fluid source and the mist collector. In an alternative preferred embodiment of the present invention, a heater is optionally provided for controlled heating of application fluid having temperature variable viscosity, to permit controlled spraying to occur regardless of the fluid's room temperature viscosity.

Another alternative preferred embodiment of the present invention comprises an improved method of using a fluid application system, comprising the steps of pumping application fluid through the circulation line to at least one spray head atomizing application fluid at each spray head; spraying of atomized application fluid onto at least one of a top, bottom and side planar surface of a work piece, through at least one spray head; and recycling excess application fluid by recovering fluid overflow through the sump drain, evacuating air from the housing into the mist collector, and separating application fluid from evacuated air in the mist collector.

The objects, benefits and advantages of the present invention accordingly are achieved by this improved closed loop controllable fluid application system, and corresponding method of using the same, whereby controllable atomized spray of application fluid onto a work piece is enabled at substantially reduced atomizing pressures and fluid pressures, regardless of fluid viscosity; application fluid viscosity may be controlled through controlled heating of such fluid to improve controllability and efficiency of atomizing spray operations and permit use of relatively low atomizing and fluid pressures; losses of application fluid to the work place environment through liquid runoff and air-borne mist, and consequent contamination of the work place and employee exposure to such fluid, are dramatically reduced; application fluid is recycled for reuse in the fluid application system; and wear and damage to work place dies and other manufacturing machinery is minimized through improved consistency of coating of the work piece through a controllable fluid application system; a reduction in scrap rates, down time and maintenance time and effort may be achieved for work piece manufacturing by reason of more consistent and complete application of application fluid without incurring excessive application; various parameters of delivering application fluid are made variable so the operator may create a set of application conditions meeting particular needs; and all of the above may be accomplished with a relatively compact, light weight, portable fluid application system of simple construction.

BRIEF DESCRIPTION OF THE DRAWINGS

Other objects, features and advantages of the present invention will become apparent after reference to the following detailed description and drawings, wherein.

DETAILED DESCRIPTION OF THE PREFERRED EMBODIMENT

Figure 1:
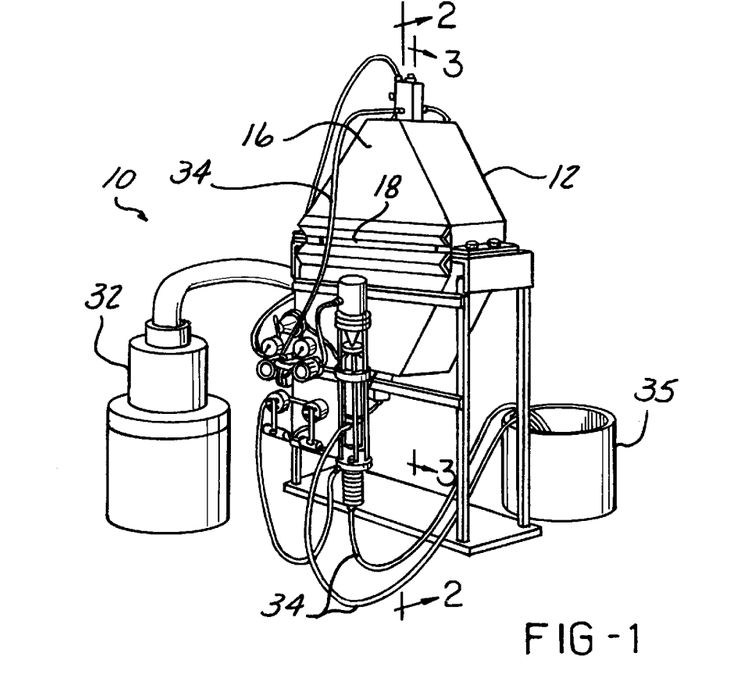
FIG. 1 is a perspective view of a closed loop controllable fluid application system in accordance with the present invention.
Figure 2:
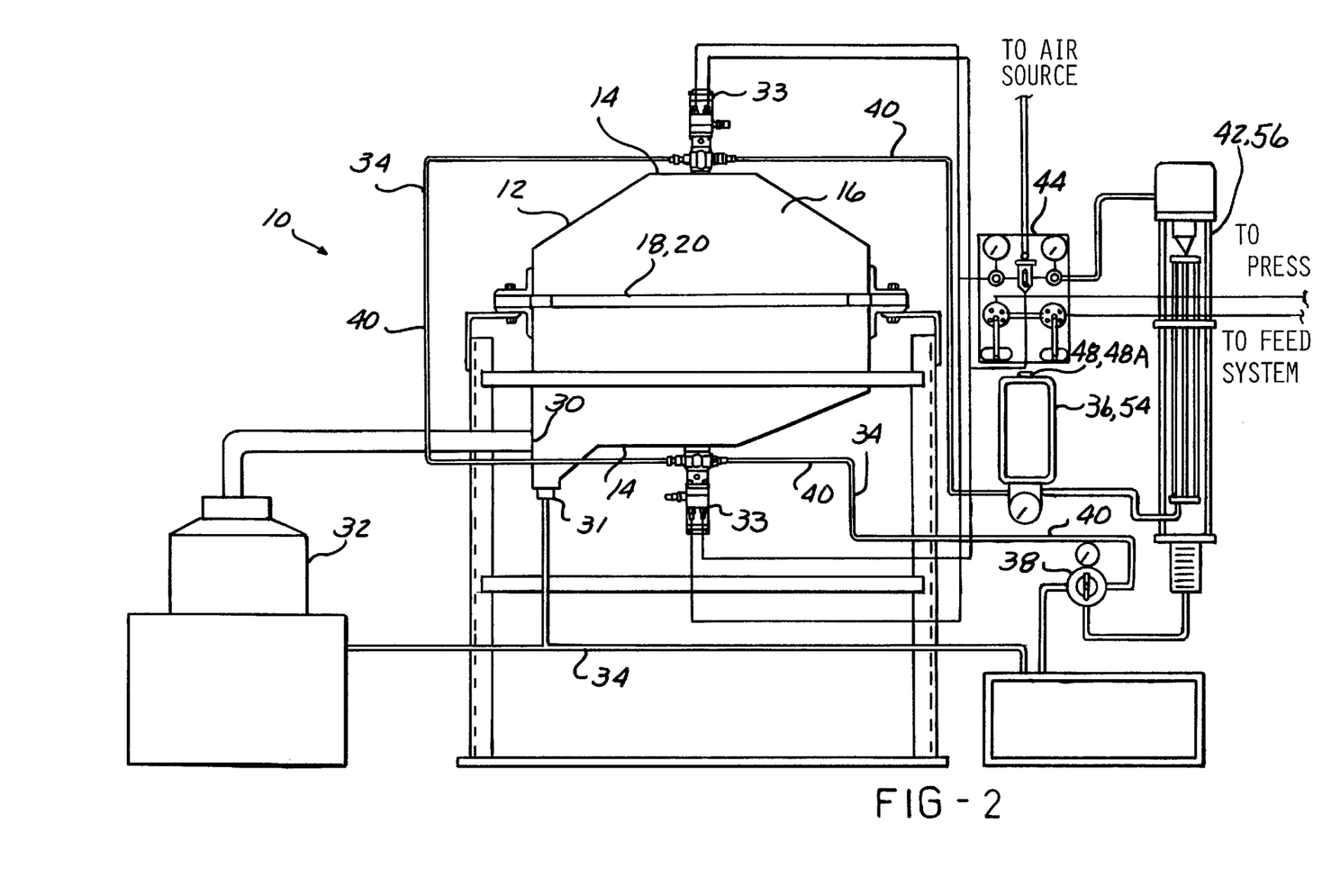
FIG. 2 is a front view of a closed loop controllable fluid application system in accordance with the present invention, shown in partial cross section taken at position 2—2 of FIG. 1.
Figure 3:
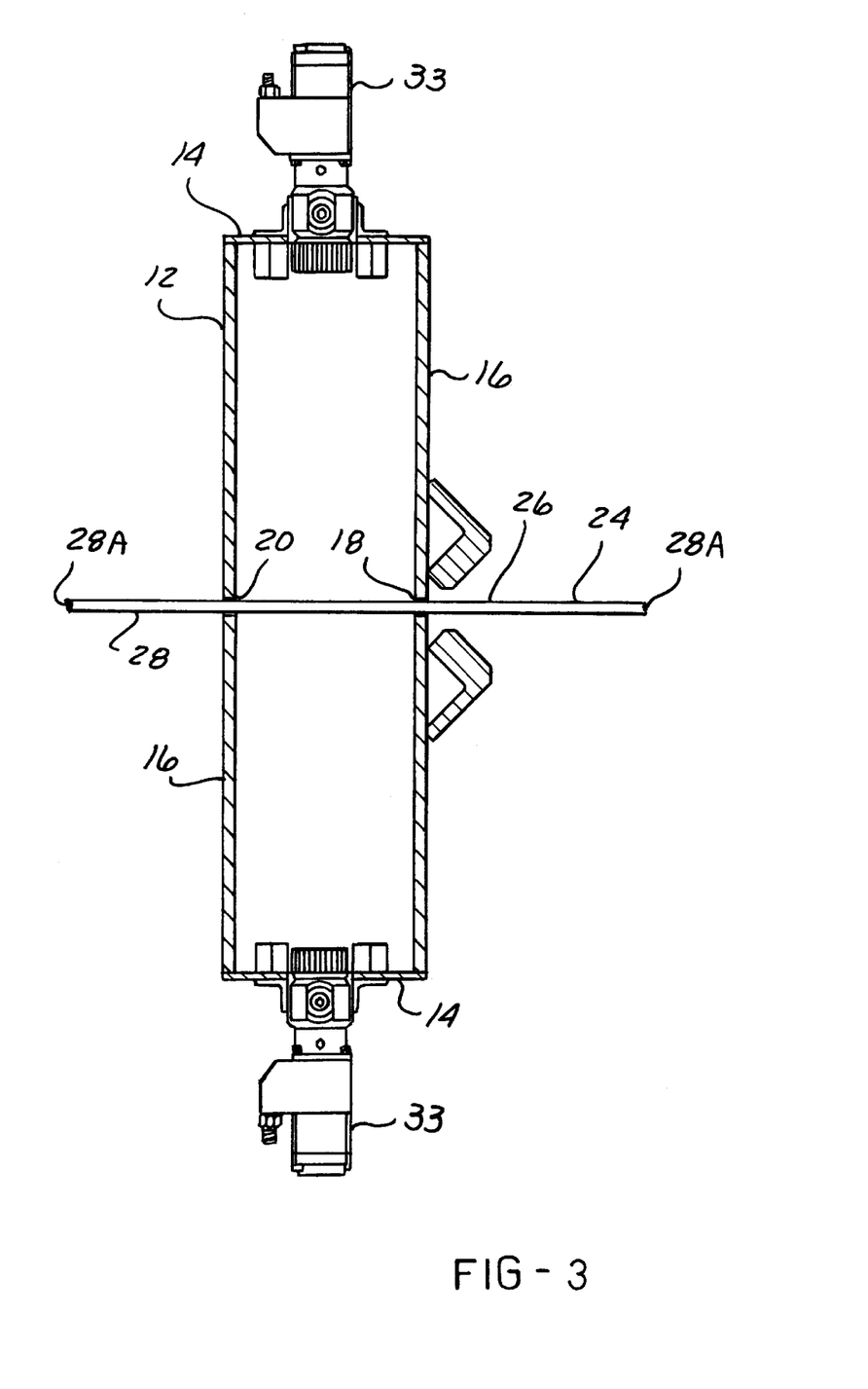
FIG. 3 is a side view of a closed loop controllable fluid application system in accordance with the present invention, shown in partial cross section taken at position 3—3 of FIG. 1.

Referring now in detail to the drawings, a closed loop controllable fluid application system in accordance with the present invention is illustrated in each of FIGS. 1 and 2, and designated generally as 10. In one preferred embodiment of the present invention as shown in FIGS. 2 and 3, the closed loop controllable fluid application system 10 comprises a substantially enclosed housing 12 optionally having one or more horizontal surfaces 14 connected to a plurality of connected vertical surfaces 16, with an inlet slot 18 and an outlet slot 20 respectively formed in opposing vertical surfaces 16 allowing passage of a work piece 24 having a top planar surface 26, a bottom planar surface 28 and a plurality of side planar surfaces 28A into and out of said housing 12. A mist outlet 30 is formed in one of a horizontal and a vertical surface 14, 16, and a sump drain 31 is formed in one of a horizontal surface 14 and a vertical surface 16.

The fluid application system 10 further comprises a mist collector 32 connected to said housing 12 at the mist outlet 30, for evacuating air from the housing 12, maintaining an air pressure level inside the housing 12 below atmospheric air pressure level, and recycling application fluid.

Fluid application system 10 additionally comprises at least one controllable atomizing spray device 33 for controlled spraying of application fluid onto a work piece 24 within the housing 12.

Fluid application system 10 further comprises at least one fluid circulation line 34 acting as a fluid conduit connecting each spray device 33 and the sump drain 31 with an application fluid source 35 and the mist collector 32.

Operation of the closed loop controllable fluid application system 10 described with reference to the embodiment shown in FIG. 2 will now be discussed. As may be seen in FIG. 1, closed loop controllable fluid application system 10 may be utilized by positioning the system 10 adjacent to an external fluid source. While no one position is required, the fluid source may preferably be positioned within convenient reach of circulation line 34 to enable application fluid to be provided to the spray device 33, as well as to allow for convenient recycling of application fluid from the mist collector 32 and the sump drain 31 of the housing 12 through additional portions of the fluid circulation line 34 which return to that fluid source.

The fluid application system 10 will also preferably be positioned adjacent to any type of conventional feed system for delivering desired work pieces into and out of the inlet slot 18 and outlet slot 20, respectively. This setup may, if desired, be positioned near a subsequent manufacturing station that will perform a stamping, drawing or other operation on the work pieces 24 for which the coating and/or lubricating effects of the application fluid system 10 are desired. While not required, the fluid source may alternatively be positioned below ground, and at a convenient location to allow for gravity to assist in recycling of application fluid from the fluid application system 10.

Fluid drawn from the fluid source passes through the circulation line 34 by any conventional method desired. Examples would include use of gravity feed as well as pumping devices. As fluid approaches the spray devices 33, the spray devices 33 will be cycled to create atomization of the application fluid through the spray devices 33 and to deliver such atomized fluid to the work piece 24 simultaneously passing through the housing 12.

Because the spray device 33 is controllable, a fan profile of the resulting spray, a time period for a spraying cycle, and a pressure under which application fluid is sprayed onto the work piece may all be adjusted by the operator.

Referring now to FIG. 4, it may seen that a spray device 33 used in accordance with the present invention may operate generally as follows. As in FIG. 4, the spray device 33 may be seen to have the following aspects to its controllability. Fan control 35A allows the operator to control fan spray pressure or direction. Atomizing air control 35B operates to provide what may be a continuously operating source of atomizing air at a desired relatively low pressure to cause the atomization of application fluid as it is sprayed toward the work piece 24.

In one embodiment of the spray device 33, the atomizing air simply creates back pressure until the spray cycle is commenced. Any conventional means may be utilized to control this spray cycle. In FIG. 4, spray device 33 incorporates a needle valve (not shown) which will be unseated by the introduction of control air at a seating air control location 35C in order to commence the spraying cycle. The actual control mechanisms for air and fluid transmittal through the system may alternatively be located externally from the spray device 33, as shown, for example, in FIG. 2.

Control air may be introduced in the range of 50 to 150 psi to unseat a typical needle valve and initiate the spraying cycle. Other pressures outside of that range may be utilized, although the specified range is preferred. Atomizing air pressure also may vary, although a pressure level of approximately 5 psi has been found to be preferred and adequate for the purposes of the present invention.

Fluid inlet 35D provides for entry of application fluid into the spray device 33, and fluid outlet 35E provides for the exit of that application fluid in certain alternative embodiments of the present invention providing for recirculation of application fluid during and between spraying cycles.

When a spraying cycle is to commence, the operator causes control air to unseat the needle valve and atomizing air is also forced against the application fluid in the spray device 33. This causes the application fluid to be directed toward the work piece 24 under a controlled pressure and controlled fan profile conditions. Timing of the spray cycle may also be controlled to not only allow for adequate horizontal spray coverage, but also to develop desired fluid thickness on the work piece 24. The position of the spray device 33 may also be adjusted to alter the distance between a spray device orifice 35F and the work piece 24 to add another control factor to enable variable adjustment of the resulting application fluid coating of the work piece 24. Control air inlet 35G and atomizing air inlet 35H are also noted on FIG. 4.

Throughout this application the term "controllable" or the term "controlled" with reference to the fluid application system 10 or the spray cycle means that the scope of the horizontal coating, the fan spray profile, the depth of fluid applications, the degree of run-off and loss of fluid to air-borne mist rather than coating of work piece 24, and the fluid pressure at which application fluid is delivered to the orifice 35F may all be or are controlled through variable, interdependent adjustments to the control air and atomizing air pressure applied to the application fluid, any profile controls on or external to the spray device 33, the distance between the orifice 35F and the work piece, the number and orientation of spray devices 33 used, the duration of each spray cycle, and the speed of the feed system. These terms are also used to refer to the capability to control fluid through recycling and mist control following the spray cycle.

While other parameters will also work to achieve the objects of the present invention, the following combination of parameters is illustrative of a preferred approach to combining controllable factors to achieve desired results with the present invention. For any one spray device 33 a typical, preferred setup may be used as follows: the spray device 33 may be positioned up to about ten inches from a plane on a surface on the work piece 24 which will receive application fluid. A fan spray angle measured between two points on a typical oval spray pattern that are farthest apart on a planar surface of the work piece 26,28 may preferably be from about eighteen degrees to about eighty two degrees. At about a ten inch distance of the spray device 33 from the work piece 24, the distance between such two points on a resulting oval spray pattern may be anticipated to reach about two inches at an eighteen degree spray. angle, and about seventeen inches at an eighty two degree spray angle.

It is even more preferred to position the spray device 33 at a distance from the work piece 24 which is within the range of about three inches to eight inches. The above described parameters may be anticipated to result in a fluid output (assuming a constant viscosity) of about 2.6 to 38 ounces per minute where fluid pressure at the orifice 35F is about 300 psi, and about 4.1 to 60.8 ounces per minute where the fluid pressure at the orifice 35F is about 600 psi.

To accomplish variation in fan spray angle, spray devices 33 may utilize variable nozzle components which contain an orifice 35F, although other techniques may be used. For a spray device 33 distance of about ten inches from a work piece 24, typical orifice diameter openings which may preferably be used for achieving a fan spray angle of from about eighteen degrees to eighty two degrees comprise about 0.004 inches up to about 0.044 inches, with as many incremental dimensions within such range as are desired. Each of the spray devices 33 may also be adjustable apart from the nozzle to provide a varying spray fan width and angle.

The controllable nature of the spray device 33 permits a significant reduction in the quantity of application fluid which must be sprayed in order to adequately lubricate and/or coat a work piece 24 for typical manufacturing operations. In addition, the quantity of application fluid lost to overrun and misting to the outside atmosphere may also be dramatically reduced due to this feature. Any application fluid that in given circumstances may still run off the work piece 24 or become air-borne mist within the housing 12, may also be dealt with to further reduce any loss of fluid and contamination of the ambient environment of the work place.

The manner in which this is done involves the use of a mist collector 32, connected as previously described to the housing 12 at the mist outlet 30. The mist collector 32 operates at least during and/or after the spray cycle to evacuate air from the housing 12 at a rate that exceeds that at which air enters the housing 12 from any openings such as the inlet and outlet slots 18 and 20. In this manner the mist collector creates and maintains an air pressure level inside the housing 12 which is below the atmospheric air pressure level outside of the fluid application system 10. As conventional fluid application systems frequently encounter problems with fully containing fluid run off and fluid emitted into the atmosphere in a mist, the creation of this pressure differential within the housing 12 offers a significant improvement in containment of the excess fluid that does not remain on the work piece 24. The applicant has found that without utilizing this evacuation technique, significant mist may escape through the inlet and outlet slots 18 and 20 into the ambient atmosphere, and contaminate the work place floor and air. By use of the mist collector 32 in this manner, the fluid escaping the housing 12 in a mist is virtually eliminated.

Application fluid run off in the form of liquid will drain into the sump drain 31 and correspondingly return to the fluid source through a circulation line 34. The fluid suspended in a mist form that is evacuated by the mist collector 32 is also recycled through a circulation line 34 to be returned to the fluid source.

One preferred technique for accomplishing this recovery of misted fluid is for the mist collector 32 to extract such fluid by the means of applying centrifugal force to the evacuated air, with the result that the fluid particles accumulate on solid surfaces to be drained into a circulation line 34. Other methods may also be utilized that will permit controlled evacuation of air from the housing 12 and extraction of application fluid from the air. Examples could include use of a fan or bellows for evacuating air, in conjunction with a filter or a gravity based drainage system for extracting fluid.

In this manner, the spray operation presents one opportunity for control of the characteristics of the spray delivered toward the work piece 24 (and substantially reduce occurrences of over-spray and under-spray). The mist collector 32 and recycling aspect of the substantially closed loop system 10 offer a second opportunity to control the fluid, by containing and recycling fluid which is not utilized on the work piece 24 for reuse at a subsequent time.

As may be seen from either FIG. 1 or FIG. 2, the inlet and outlet slots 18 and 20 may be constructed in the housing 12 in any desirable configuration and width to accommodate work pieces 24 of varying dimensions. In addition, as may be seen in FIG. 3, the housing 12 itself may be constructed of a compact, and light weight design. The controllable nature of the spray, and consequent ability to operate at significantly reduced pressures with regard to both fluid and air introduced into the system 10, allows the system 10 to be portable, and compact in nature.

The present invention may also comprise a number of alternative embodiments, some of which will now be described.

In certain manufacturing operations, it is desirable to have coating and/or lubrication of a work piece 24 on a top, bottom and/or a side planar surface 26, 28, 28A. In other operations, only one or two of a top, bottom and side planar surface 26, 28, 28A are desired to receive application fluid. In one alternative preferred embodiment of the present invention, one or more spray device 33 is oriented to apply application fluid to one or more of a top planar surface of a work piece 26, a bottom planar surface of a work piece 28, and at least one side planar surface of a work piece 28A. In this embodiment, a number of spray devices 33 may be preferably used with regard to any or all of the top, bottom and/or side planar surfaces 26, 28, 28A, depending upon which planar surfaces require such application.

In a similar alternative preferred embodiment, one or more spray device 33 is oriented to apply application fluid to each of a top planar surface of a work piece 26, a bottom planar surface of a work piece 28, and if desired to one or more side planar surfaces 28A. In operation, it is frequently found desirable to utilize multiple spray devices 33 for spraying application fluid on one, two or all of top, bottom and side planar surfaces 26, 28, 28A. A side planar surface 28A may be essentially perpendicular or at any other angle to a top or bottom planar surface 26, 28. It may be understood that any combination of top, bottom and/or side planar surfaces 26, 28, 28A, and any number of each, may be serviced in this manner. The choice of the number of spray devices 33 utilized for any such planar surface 26, 28, 28A is made by considering the horizontal and vertical dimensions of the work piece 24, the speed of the feed system in delivering the work piece 24 and the desired characteristics of the application fluid coating to be applied to the work piece 24.

In another alternative preferred embodiment of the present invention, the fluid application system 10 further comprises a heater 36 as shown in FIG. 2 communicating with the fluid circulation line 34 for controlled heating of any application fluid having a viscosity varying with temperature. The applicant has found that atomized spraying of application fluid which has a high room temperature viscosity is difficult to achieve without using extremely high air pressure to, cause atomization and provide satisfactory spraying to coat the work piece 24. Spraying of such high viscosity fluids also tends to clog components of a fluid application system and increases the incidence of wearing and failure of system components due to the high pressures involved. The applicant has found through testing with heavy drawing oil that not only may a significant decrease in viscosity be observed with corresponding increases in temperature, but unexpected, significant improvement in the ability to atomize such fluids at relatively low atomizing air pressure, with consequent improvement in controllability of the fluid being sprayed, was encountered. The result is that by heating such application fluid to obtain a decrease in viscosity, and spraying heated fluid, not only was the spray control improved, but the entire system could be operated at significantly reduced air and liquid pressures and down time for maintenance and cleaning of the system. In addition, resulting loss of application fluid to the environment was significantly reduced.

Utilizing a heater to lower application fluid viscosity, the applicant has also discovered that returning such heated fluid to the external fluid source, or actually heating the fluid at or near that source could have adverse effects upon the system operation. For example, flashing of application fluid could occur when introducing heated fluid into a source containing ambient temperature fluid. In addition, the characteristics of the fluid in the source could be altered by mixing of the varying temperatures, making the fluid characteristics at the spray device 33 unpredictable. The fluid may not be delivered for spraying at the desired elevated temperature. One alternative preferred embodiment of the present invention accordingly further comprises a recirculation valve 38 and a subloop circulation line 40 connected to the circulation line 34 in the vicinity of the spray device 33. It is contemplated that a recirculation valve 38 and subloop circulation line 40 would be connected to each such spray device 33 to allow heated application fluid to continuously recirculate in the subloop circulation line 40 during and between spraying cycles so that the heated application fluid would not be returned to the fluid source. Recirculation thus may occur at all times prior to, during and after a spraying of atomized application fluid. In this manner, the recirculation valve 38 redirects the heated application fluid into the subloop circulation line 40 until a spraying cycle is initiated. At that time the heated application fluid is utilized to spray the work piece 24 and is replenished with additional heated application fluid delivered to the spray device 33 as previously described.

A further alternative preferred embodiment of the present invention further comprises a pump 42 communicating with the fluid circulation line 34 for transmitting application fluid through the circulation line 34 under controllable pressure. By use of a pump 42 the fluid may be delivered to the spray device 33 under sufficient pressure to enable adequate spray cycles to occur, but without the necessity of building pressure to assist in the spraying technique. The controllable nature of the spray device 33 enables the pump to simply operate to deliver fluid as needed.

As previously noted, the spray device 33 may be coordinated with the feeding system for deliver of the work piece 24 into the housing 12 such that the spray cycles may be intermittent rather than continuous. As noted, a control device 44, shown in FIG. 2, may be utilized to coordinate the spray device 33 and the feed system, as well as potentially to coordinate the operation of the spray cycle with any subsequent manufacturing step so that the fluid application and manufacturing operation are controlled to coordinate timing of the entry of the prepared work piece 24 into the stamping press or other machinery involved. An alternative preferred embodiment of the present invention accordingly further comprises a control device 44 communicating with each spray device 33 for controlling operation of such spray device 33, wherein such spray device 33 may, for example, utilize pressurized gas to atomize the application fluid. Such a control device 44 may include a solenoid which operates to signal the start of control air introduction to the spray device 33 and consequent commencement of a spraying cycle. Control device 44 may also operate to control atomizing air supplied to the spray device 33. The fluid application system 10 may alternatively operate utilizing pressurized liquid to atomize application fluid. Any conventional control device 44 may be used.

Figure 4:
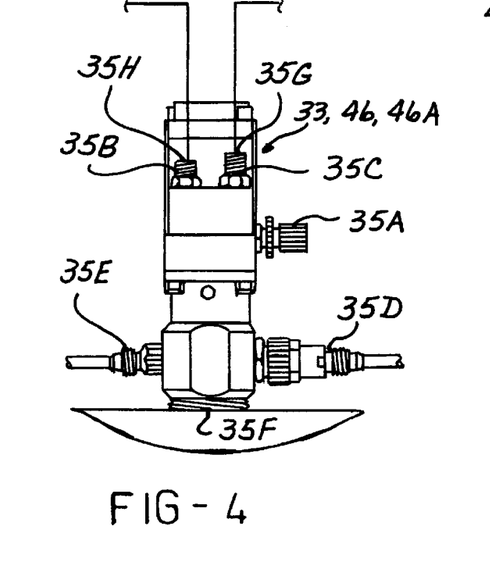
FIG. 4 is a front view of one embodiment of an atomizing spray device in the form of a spray head.
Figure 5:
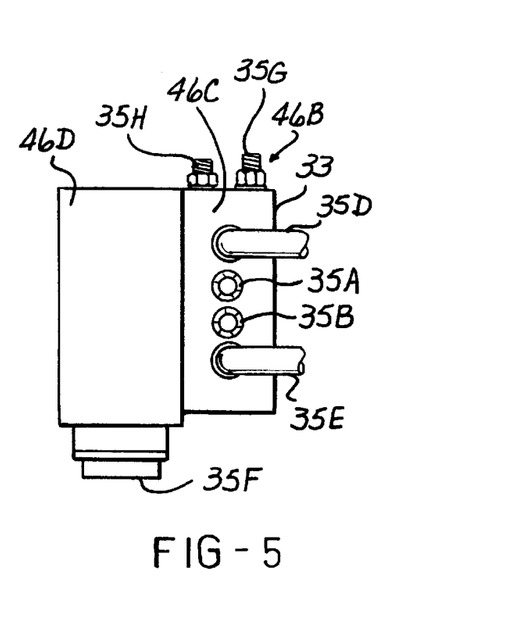
FIG. 5 is a front view of an alternative embodiment of an atomizing spray device in the form of a modular spray head.

In one alternative preferred embodiment of the present invention, each spray device 33 may comprise a spray head 46. Any controllable spray head able to accomplish the purposes described herein may operate as a spray device 33. One preferred example of a spray head 46 comprises a Kremlin AR automatic spray head 46A, shown in FIG. 4. Another alternative spray head 46 comprises a modular form of spray head, an example of which comprises a Kremlin modular ATX spray head 46B shown in FIG. 5. While the Kremlin AR automatic spray head 46A is preferred, even more preferred is the Kremlin modular ATX spray head 46B. This is for the principal reason that a modular spray head permits the air inlet and fluid inlet and outlet locations, and any controls located on the spray device 33 to be positioned on an anchor block 46C so that an applicator 46D may be disconnected from the anchor block 46C for cleaning or replacement of the applicator 46D without the necessity of disconnecting circulation lines 34 and control and atomizing air lines. In this manner, rapid maintenance and changes of an applicator 46D, or of a type of orifice 35F may be accomplished.

In another alternative preferred embodiment, the fluid application system 10 may further comprise at least one temperature control device 48 for controlling the temperature of application fluid delivered to each spray device 33. As previously noted, a heater 36 may be useful in certain instances for heating application fluid being delivered to the spray device 33. Any temperature control device 48 which monitors the temperature of the heated fluid and correspondingly signals the heater 36 to control the application fluid temperature will work for this purpose. An example of such a temperature control device 48 comprises an inline thermostat 48A communicating with the heater 36. An inline thermostat 48A is shown in FIG. 2.

Referring again to FIG. 2, in an alternative preferred embodiment utilizing a heater 36, such a heater 36 may comprise an isolated thermostatically controlled electric heater 54, and the pump 42 may comprise a Kremlin model 08:25 shown as 56. Even more preferred would be a Kremlin model Flowmax 17A pump, which is similar to the Kremlin model 08:25 but offers improved control of fluid pressure.

A method of using a closed loop controllable fluid application system 10, as such system may be described with reference to any of the FIGS. 1–5, will now be described. This method may be utilized with any closed loop controllable fluid application system 10 encompassed within the scope of any of the preferred embodiments of the present invention.

Referring for example to the embodiment of the fluid application system 10 described with reference to FIG. 2, a method of using a closed loop controllable fluid application system 10 comprises the steps of:

(1) pumping application fluid through the circulation line 34 to at least one spray head 33;
(2) spraying of atomized application fluid onto at least one of a top, bottom and side planar surface 26, 28, 28A of a work piece 24, through at least one spray head 33;
(3) recycling application fluid by:
   (a) recovering fluid overflow through the sump drain 31;
   (b) evacuating air from the housing 12 into the mist collector 32; and
   (c) separating application fluid from evacuated air through use of centrifugal force
   in the mist collector 32.

In addition, an alternative embodiment of a method of using a closed loop controllable fluid application system 10 further comprises the steps of:

(1) controlled heating of application fluid prior to atomized spraying; and
(2) recirculating heated application fluid through a recirculation valve 38 and a subloop circulation line 40 prior to, during and after spraying of application fluid.

Any of these methods may also further comprise the step of maintaining an air pressure level inside the housing below atmospheric air pressure level.

These methods are each equally applicable for use with any alternative preferred embodiment of fluid application system 10 described herein. Thus, for example, any alternatives to use of centrifugal force with a mist collector 32 may be used.

Following are examples of selected test results of the operation of two fluid application systems.

Example 1 comprises test results of a conventional fluid application system to determine the parameters achieved through its use.

Example 2 comprises selected test results to determine the operational parameters achieved through the use of one preferred embodiment of fluid application system 10 in accordance with the present invention. Example 2 is exemplary, and is not meant to represent the exclusive parameters or combinations of components which will produce the results shown, or otherwise desirable results. Other combinations and parameters, including those outside those specified in Example 2, will also work.

EXAMPLE 1

In this example, a fluid application system operating with a conventional uncontrolled, open air atomizing spray technique, was utilized at a relatively high pressure of atomization to test the operational parameters achieved. A test run was conducted by lubricating 5,000 work pieces with one spray device, using drawing oil as the application fluid. The time used to spray each part comprised 4.2 seconds; and the time utilized for one complete cycle including overlap between spray cycles comprised 6 seconds. An airless pump with an approximate 20:1 ratio was utilized to force a stream of application fluid through an orifice, causing the application fluid to atomize and spray onto the work pieces. This pump created fluid pressure against the spray device orifice of approximately 2500 to 3000 psi. This comprised the pressure at which the fluid exited the orifice. The oil consumption during the test run of 5,000 parts comprised 85.94 U.S. gallons. This was the amount of application fluid which was not recovered or otherwise recycled in any manner during the test. Thus, the application fluid lost to the environment was 85.94 gallons.

EXAMPLE 2

A closed loop controllable fluid application system 10 in accordance with one preferred embodiment of the present invention was tested to determine certain operational parameters. A test run of 5,000 parts was lubricated with drawing oil through the use of two spray devices. The time used to spray one work piece comprised 4.2 seconds; and the time used for one spray cycle including overlap time between such cycles comprised 6 seconds. The application fluid was heated to an approximate temperature of 120° F. The air pressure (atomizing air pressure) utilized was approximately 5 psi. A fluid pump was used to deliver fluid to a spray orifice 35F at a fluid pressure of approximately 300 to 500 psi. The application fluid which was consumed during the test comprised 6.24 gallons. This was the amount of oil not recovered or recycled by means of operation of the fluid application system 10. Stamping of components was then completed with the test run of parts. No scoring was found on any of the parts following the stamping operations, and tolerances were within specifications, indicating lubrication was appropriately achieved. No appreciable change in die condition was noted.

The following example shows the result of tests conducted on QUAKER DRAW 49-LS-EM drawing oil to determine the viscosity of such drawing oil at various temperatures.

EXAMPLE 3

A test was conducted by heating QUAKER DRAW 49-LS-EM drawing oil to various temperatures and determining the viscosity (in cps) at the various temperatures tested. This is a highly refined synthetic lubricant having selected pressure and film strength additives. It has a flash point of 177° C. and a weight per Imperial gallon of 9.76 lbs. This oil may be used for deep draw applications requiring significant coating and lubrication properties. The results were as follows:

| Temperature ° F. | Viscosity (cps) |
|---|---|
| 70 | 2240 |
| 80 | 1425 |
| 90 | 950 |
| 100 | 655 |
| 110 | 465 |
| 120 | 340 |

It may be seen that not only did a significant drop in viscosity occur upon an increase in temperature of the drawing oil, but the viscosity decreased at more than a linear rate upon a linear increase in the drawing oil temperature.

Although only a few embodiments have been described in detail above, those having ordinary skill in the art will certainly understand that many modifications are possible in the preferred embodiment without departing from the teachings thereof. All such modifications are intended to be encompassed in the following claims.

I claim:

1. A method of using a closed loop controllable fluid application system for applying fluid from an application fluid source to a work piece having a plurality of planar surfaces, the fluid application system comprising:

a substantially enclosed housing having substantially vertical front, back and side walls, and a bottom horizontal wall;

an inlet opening in one of the front and the back walls, the inlet opening of sufficient dimensions to allow passage of the work piece therethrough and into the housing;

an outlet opening in the other of the front and the back walls, the outlet opening of sufficient dimensions to allow passage of the work piece therethrough and out of the housing;

at least one atomizing spray device mounted to, and positioned within the housing so as to direct spraying of application fluid onto at least one of the work piece planar surfaces within the housing;

a sump drain in the housing bottom wall, for collecting any fluid run-off from the at least one of the work piece planar surfaces;

a mist collector fluidly connected to the housing via at least a mist outlet opening in one of the walls, the mist outlet opening of sufficient dimensions to allow passage of mist therethrough;

means for evacuating air from the housing;

means for maintaining an air pressure level inside the housing below atmospheric air pressure level;

means, operatively connected to the mist collector, for recycling any misted application fluid; and at least one circulation conduit for supplying application fluid to the at least one spray device, for transferring any collected fluid from the sump drain to the application fluid source, and for transferring any recycled misted application fluid from the recycling means to the application fluid source;

said method comprising the steps of:

pumping application fluid through the circulation conduit to the at least one spray device;

atomizing application fluid at the at least one spray device;

spraying atomized application fluid onto the at least one of the work piece planar surfaces;

controlling the spray of application fluid within a predetermined set of variable, interdependent parameters; and recycling excess application fluid, the recycling step comprising the steps of:

recovering fluid overflow through the sump drain;

evacuating air from the housing into the mist collector; and separating application fluid from evacuated air in the mist collector, wherein separating of application fluid from evacuated air is accomplished through use of centrifugal force.

2. A method of using a closed loop controllable fluid application system as recited in claim 1, wherein the application fluid has a viscosity which varies with temperature, and wherein the fluid application system further comprises:

a subloop circulation conduit in fluid communication with the circulation conduit at a point between the application fluid source and the at least one spray device;

a heater in fluid communication with the circulation conduit and the subloop circulation conduit;

means for regulating the heater so as to control the temperature of application fluid delivered to the at least one spray device; and a recirculation valve operatively connected to the subloop circulation conduit and the circulation conduit, the recirculation valve being selectively actuable to direct flow into at least one of the subloop circulation conduit and the circulation conduit;

wherein the method further comprising the steps of:

heating the application fluid prior to spraying atomized application fluid; and recirculating heated application fluid through the recirculation valve and the subloop circulation conduit prior to, during and after spraying the atomized application fluid.

3. A method of using a closed loop controllable fluid application system as recited in claim 1, further comprising the step of maintaining an air pressure level in the housing below atmospheric air pressure level.

4. A method of using a closed loop controllable fluid application system for applying fluid from an application fluid source to a work piece having a plurality of planar surfaces, the work piece being within a substantially enclosed housing, the method comprising the steps of:

atomizing application fluid at at least one spray device, which application fluid has been pumped through a circulation conduit to the at least one spray device;

spraying atomized application fluid onto [the] at least one of the work piece planar surfaces;

controlling the spray of application fluid within a predetermined set of variable, interdependent parameters; and recycling excess application fluid, wherein the recycling step comprising the steps of:

recovering fluid overflow;

evacuating air from the housing; and separating application fluid from evacuated air, wherein separating of application fluid from evacuated air is accomplished through use of centrifugal force.

5. The method as defined in claim 4, further comprising the step of maintaining an air pressure level in the housing below atmospheric air pressure level.

6. The method as defined in claim 4 wherein the atomizing step is accomplished by means of one of pressurized gas and pressurized liquid.

7. The method as defined in claim 4 wherein the spray device has an orifice, and wherein the fluid pressure at the orifice ranges between about 300 psi and about 600 psi.

8. A method of using a closed loop controllable fluid application system for applying fluid from an application fluid source to a work piece having a plurality of planar surfaces, the work piece being within a substantially enclosed housing, the application fluid having a viscosity which varies with temperature, the method comprising the steps of:

atomizing application fluid at at least one spray device, which application fluid has been pumped through a circulation conduit to the at least one spray device;

spraying atomized application fluid onto at least one of the work piece planar surfaces;

controlling the spray of application fluid within a predetermined set of variable, interdependent parameters;

recycling excess application fluid, wherein the recycling step comprising the steps of:
recovering fluid overflow;
evacuating air from the housing; and
separating application fluid from evacuated air, wherein separating of application fluid from evacuated air is accomplished through use of centrifugal force;

heating the application fluid prior to spraying atomized application fluid; and recirculating heated application fluid through a recirculation valve and a subloop circulation conduit prior to, during and after spraying the atomized application fluid.

9. The method as defined in claim 8, further comprising the step of maintaining an air pressure level in the housing below atmospheric air pressure level.

10. The method as defined in claim 8 wherein the atomizing step is accomplished by means of one of pressurized gas and pressurized liquid.

11. The method as defined in claim 8 wherein the spray device has an orifice, and wherein the fluid pressure at the orifice ranges between about 300 psi and about 600 psi.

12. A closed loop controllable fluid application system, for applying fluid from an application fluid source to a work piece having a plurality of planar surfaces, the system comprising:

a substantially enclosed housing having substantially vertical front, back and side walls, and a bottom horizontal wall;

an inlet opening in one of the front and the back walls, the inlet opening of sufficient dimensions to allow passage of the work piece therethrough and into the housing;

an outlet opening in the other of the front and the back walls, the outlet opening of sufficient dimensions to allow passage of the work piece therethrough and out of the housing;

at least one atomizing spray device mounted to, and positioned within the housing so as to direct spraying of application fluid onto at least one of the work piece planar surfaces within the housing, the at least one spray device comprising means, operatively connected to the at least one spray device, for controlling the spray of application fluid within a predetermined set of parameters;

a sump drain in the housing bottom wall, for collecting any fluid run-off from the at least one of the work piece planar surfaces;

a mist collector fluidly connected to the housing via at least a mist outlet opening in one of the walls, the mist outlet opening of sufficient dimensions to allow passage of mist therethrough;

means for evacuating air from the housing;

means for maintaining an air pressure level inside the housing below atmospheric air pressure level;

means, operatively connected to the mist collector, for recycling any misted application fluid;

at least one circulation conduit for supplying application fluid to the at least one spray device, for transferring any collected fluid from the sump drain to the application fluid source, and for transferring any recycled misted application fluid from the recycling means to the application fluid source; and a pump fluidly communicating with the circulation conduit, for transmitting application fluid through the circulation conduit under a predetermined pressure.

13. A closed loop controllable fluid application system as recited in claim 12 wherein the work piece has a top planar surface, a bottom planar surface, and at least one side planar surface, and wherein the at least one atomizing spray device is positioned so as to direct spraying of application fluid onto at least two of the work piece planar surfaces.

14. A closed loop controllable fluid application system as recited in claim 12 wherein the application fluid has a viscosity which varies with temperature, the system further comprising:

a subloop circulation conduit in fluid communication with the circulation conduit at a point between the application fluid source and the at least one spray device;

a heater in fluid communication with the circulation conduit and the subloop circulation conduit;

means for regulating the heater so as to control the temperature of application fluid delivered to the at least one spray device; and a recirculation valve operatively connected to the subloop circulation conduit and the circulation conduit, the recirculation valve being selectively actuable to direct flow into at least one of the subloop circulation conduit and the circulation conduit.

15. A closed loop controllable fluid application system as recited in claim 12 wherein the spray controlling means comprises a control device, and wherein the system further comprises means, operatively connected to the spray device, for supplying pressurized gas to atomize the application fluid.

16. A closed loop controllable fluid application system as recited in claim 12 wherein the spray controlling means comprises a control device, and wherein the system further comprises means, operatively connected to the spray device, for supplying pressurized liquid to atomize the application fluid.

17. A closed loop controllable fluid application system as recited in claim 12, wherein the at least one spray device comprises a spray head.

18. A closed loop controllable fluid application system as recited in claim 17, wherein the at least one spray device comprises an automatic spray head.

19. A closed loop controllable fluid application system as recited in claim 18, wherein the at least one spray device comprises a modular spray head.

20. A closed loop controllable fluid application system as recited in claim 14, wherein the heater comprises an isolated coil electric heater, and the regulating means comprises an in-line thermostat.

21. A closed loop controllable fluid application system as recited in claim 13, further comprising a pump communicating with the circulation conduit, and wherein the at least one spray device comprises an automatic spray head.

22. A closed loop controllable fluid application system as recited in claim 13, further comprising a pump communicating with the circulation conduit, and wherein the at least one spray device comprises a modular spray head.

23. The closed loop controllable fluid application system as recited in claim 12 wherein each of the evacuating means, the air pressure maintaining means, and the recycling means are disposed within the mist collector.

24. The closed loop controllable fluid application system as recited in claim 23 wherein the recycling means comprises a centrifuge fluidly connected to the circulation conduit, the centrifuge adapted to separate evacuated air from any fluid particles, wherein the separated fluid particles flow into the circulation conduit.

25. The closed loop controllable fluid application system as recited in claim 12 wherein the at least one spray device has a fluid application orifice, and wherein the predetermined set of parameters comprises at least one of scope of horizontal coating, fan spray profile, depth of fluid application, degree of run-off, degree of misted fluid, and fluid pressure at which application fluid is delivered to the orifice.

26. The closed loop controllable fluid application system as recited in claim 12 wherein the system is light weight and portable.

27. A closed loop controllable fluid application system, for applying fluid from an application fluid source to a work piece having a top planar surface, a bottom planar surface, and at least one side planar surface, the system comprising:

a substantially enclosed housing having substantially vertical front, back and side walls, and substantially horizontal top and bottom walls;

an inlet opening in the front wall, the inlet opening of sufficient dimensions to allow passage of the work piece therethrough and into the housing;

an outlet opening in the back wall, the outlet opening of sufficient dimensions to allow passage of the work piece therethrough and out of the housing;

two atomizing spray heads, each having a fluid application orifice, one head being mounted to the top wall of the housing, the other being mounted to the bottom wall of the housing, the spray heads being positioned within the housing so as to direct spraying of application fluid onto at least the work piece top planar surface and the bottom planar surface within the housing, the spray heads each comprising means, operatively connected to each spray head, for controlling the spray of application fluid within a predetermined set of parameters;

a sump drain in the housing bottom wall, for collecting any fluid run-off from the at least one of the work piece planar surfaces;

a mist collector fluidly connected to the housing via at least a mist outlet opening in one of the walls, the mist outlet opening of sufficient dimensions to allow passage of mist therethrough, wherein the mist collector comprises means for evacuating air from the housing, and means for maintaining an air pressure level inside the housing below atmospheric air pressure level;

at least one circulation conduit for supplying application fluid to the two spray heads, and for transferring any collected fluid from the sump drain to the application fluid source;

a centrifuge disposed within the mist collector and fluidly connected to the circulation conduit, the centrifuge adapted to separate evacuated air from any fluid particles, wherein the separated fluid particles flow into the circulation conduit and are transferred via the conduit to the application fluid source;

a pump fluidly communicating with the circulation conduit, for transmitting application fluid through the circulation conduit under a predetermined pressure; and means, operatively connected to the spray device, for supplying one of pressurized gas and pressurized liquid to atomize the application fluid.

28. A closed loop controllable fluid application system as recited in claim 27 wherein the application fluid has a viscosity which varies with temperature, the system further comprising:

a subloop circulation conduit in fluid communication with the circulation conduit at a point between the application fluid source and the spray heads;

an isolated coil electric heater in fluid communication with the circulation conduit and the subloop circulation conduit;

means for regulating the heater so as to control the temperature of application fluid delivered to the spray heads, wherein the regulating means comprises an in-line thermostat; and a recirculation valve operatively connected to the subloop circulation conduit and the circulation conduit, the recirculation valve being selectively actuable to direct flow into at least one of the subloop circulation conduit and the circulation conduit.

29. A closed loop controllable fluid application system as recited in claim 27, wherein the spray heads each comprise a modular spray head.

30. A closed loop controllable fluid application system as recited in claim 29 wherein the system is light weight and portable, and wherein the predetermined set of parameters comprises at least one of scope of horizontal coating, fan spray profile, depth of fluid application, degree of run-off, degree of misted fluid, and fluid pressure at which application fluid is delivered to the orifice.

\* \* \* \* \*